US006633575B1

(12) United States Patent
Koodli

(10) Patent No.: US 6,633,575 B1
(45) Date of Patent: Oct. 14, 2003

(54) METHOD AND APPARATUS FOR AVOIDING PACKET REORDERING IN MULTIPLE-CLASS, MULTIPLE-PRIORITY NETWORKS USING A QUEUE

(75) Inventor: Rajeev Koodli, Natick, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/287,321

(22) Filed: Apr. 7, 1999

(51) Int. Cl.$^7$ ............................................. H04L 12/00
(52) U.S. Cl. ........................ 370/412; 370/394; 710/54
(58) Field of Search ........................... 710/52, 53, 54, 710/310; 370/351, 389, 394, 412, 413, 415, 417

(56) References Cited

U.S. PATENT DOCUMENTS

| | | | | | |
|---|---|---|---|---|---|
| 5,278,828 A | * | 1/1994 | Chao | ........................... | 370/394 |
| 5,359,592 A | * | 10/1994 | Corbalis et al. | ............ | 370/233 |
| 5,502,719 A | * | 3/1996 | Grant et al. | ................ | 359/117 |
| 5,838,915 A | * | 11/1998 | Klausmeier et al. | ........ | 370/412 |
| 5,872,769 A | * | 2/1999 | Caldara et al. | ............. | 370/230 |
| 5,872,938 A | * | 2/1999 | Williams | .................... | 710/112 |
| 6,134,217 A | * | 10/2000 | Stiliadis et al. | ............. | 370/232 |
| 6,430,191 B1 | * | 8/2002 | Klausmeier et al. | ........ | 370/412 |
| 6,490,640 B1 | * | 12/2002 | Johansson | .................... | 710/52 |

FOREIGN PATENT DOCUMENTS

EP      0 715 7436 A      5/1996

OTHER PUBLICATIONS

May et al., "Simple Performance Models of Differentiated Services Schemes for the Internet," New York, NY, IEEE, US, Mar. 21, 1999, pp. 1385–1394.

X Xiao, "Internet QOS: A Big Picture," IEEE Network, The Magazine of Computer Communications, US, IEEE Inc., New York, vol. 13, no, Mar. 1999, pp. 8–18.

"Differentiated Services Operational Model and Definitions", http://agni.csa.iisc.ernet.in/Standards/internet–drafts/draft–nichols–dsopdef–00.txt, last updated Jul. 16, 1999, pp. 1–14.

"IP Precedence in Differentiated Services Using the Assured Service", http://ntn–guy.canet2.net/qos/draft–ietf–diffserv–precedence–00.txt, last updated Jul, 15, 1999, pp. 1–15.

"An Architecture for Differentiated Services", ftp://ftp.isi.edu/in–notes/rfc2475.txt, last updated Jul. 15, 1999, pp. 1–32.

Floyd et al., "Random Early Detection Gateways for Congestion Avoidance", IEEE/ACM Transactions on Networking vol. 1, No. 4, pp. 1–32, Aug. 1993.

* cited by examiner

Primary Examiner—Melvin Marcelo
Assistant Examiner—Derrick W. Ferris
(74) Attorney, Agent, or Firm—Squire, Sanders & Dempsey LLP

(57) ABSTRACT

A method and apparatus for avoiding packet reordering in multiple-class, multiple-priority networks. The present invention provides a queue implementation technique that can be used in multiple-class, multiple-priority networks such as Differentiated Services networks to ensure that packets are serviced without reordering. The queue implementation technique maintains performance isolation between different classes under some scheduling disciplines and can identify scheduling disciplines which do not degrade the performance seen by the lower priority traffic classes. The system includes a first queue for receiving packets associated with a first traffic class, the packets being arranged in the first queue as in-profile packets and out-profile packets and a second queue for storing pointers associated with the out-profile packets, wherein the packets in the first queue comprise doubly-linking, and the pointers associated with the out-profile packets in the second queue point to corresponding out-profile packets in the first queue as well as to a previous and next element in the second queue.

36 Claims, 5 Drawing Sheets

METHOD AND APPARATUS FOR AVOIDING PACKET REORDERING IN MULTIPLE-CLASS, MULTIPLE-PRIORITY NETWORKS USING A QUEUE

BACKGROUND OF THE INVENTION

1. Field of the Invention

This invention relates in general to a packet forwarding in a network, and more particularly to a method and apparatus for avoiding packet reordering in multiple-class, multiple-priority networks using a queue.

2. Description of Related Art

The primary Internet transport protocols, most importantly the Transmission Control Protocol (TCP), have been very carefully designed and tuned over the past 25 years to support a service model of graceful degradation, where connections are essentially never denied and every connection's performance simply degrades as the network load increases.

Originally designed to interconnect the huge, heterogeneous assortment of computers within the U.S. Government, TCP/IP has since grown into a complete family of "open" (royalty-free) protocols that enable computers to communicate over any combination of local- and wide-area network links. Bundled for many years with UNIX, commercial implementations of TCP/IP are now available for every make and model of computer system. The recent explosive growth in demand for access to the Internet, which is based on TCP/IP, has established TCP/IP as the computer industry's de facto network protocol standard.

The various members of the TCP/IP protocol family work cooperatively in a "stacked" architecture. When a network user (client) requests a certain kind of service, TCP/IP's upper-level protocols invoke the functions of lower protocols to form the necessary network interface.

For example, when a user runs a World Wide Web (WWW) application on a client computer and requests a file to be downloaded from an hyper-text transfer protocol (HTTP) server, the client system's WWW application and its underlying TCP/IP protocol stack software: 1) formulate a protocol request; 2) enclose (encapsulate) the request within one or more Transmission Control Protocol (TCP) packets to ensure its acknowledged delivery; 3) encapsulate each resultant TCP packet within an IP packet, which includes the network address (IP address and port number) of the server; and 4) depending on the underlying LAN or WAN network hardware, encapsulate each IP packet within the appropriate frame for transmission.

The corresponding TCP/IP protocol stack on the server, in turn, decapsulates the incoming frame and acts on the request it contains. Later, the server delivers the requested file to the client by similarly encapsulating and transmitting it through the network.

One of TCP/IP's greatest strengths is its extensible architecture. Over the years, new protocols have occasionally been added to TCP/IP to support innovative network hardware or deliver new kinds of services, without disrupting the operation of existing protocols. New protocols were introduced at the same architectural level and used as an alternative to prior protocols that were found to be insufficient under new applications. As one such example, consider the User Datagram Protocol (UDP), whose introduction as an alternative to TCPI facilitated network applications like the Network File System (NFS) and the Simple Network Management Protocol (SNMP).

While new protocols can be added relatively painlessly to the TCP/IP family, changes to established protocols unavoidably affect existing applications. Consequently, throughout TCP/IP's history, such changes have been made very carefully, and only when absolutely necessary. Changing any protocol in a widely adopted system like TCP/IP can put millions of network users at risk.

Nowhere within TCP/IP is the potential risk of change greater than at the family's central routing function: the Internet Protocol. IP defines the addressing scheme for all TCP/IP devices, and is the central implementation issue in the many thousands of routers that serve the needs of the worldwide Internet community 24 hours a day.

For years now, the members of TCP/IP's regulating organization, the Internet Engineering Task Force (IETF), have known that the current version of IP is in need of an overhaul. After perhaps the most careful design and review process in the history of networking, that long-awaited revision is nearing completion.

Developed over many years of careful design and exhaustive review, the IPv6 (IPng) addressing scheme is radically new, based on the demographic nature of the community it will serve. At the same time, IPv6 includes provisions for upward compatibility from and interpretability with today's IPv4 network architecture.

The service model for which the next generation of the Internet strives is neither strictly the circuit switched model of the telephone system, nor the best-efforts model of the current Internet, but rather an integrated approach where Quality of Service (QoS) traffic coexists with best-effort traffic. The primary design goal behind this approach is to share network resources in such a way that one can simultaneously achieve the benefits of circuit-switched networks (performance guarantees) and the benefits of best-efforts networks (low cost due to resource sharing).

From a desire to find an approach that would be simple, scalable, and relatively easy to deploy in a predominantly best-efforts Internet, the concept of Differentiated Services has originated. In addition, within differentiated services there is significant emphasis on allowing for meaningful end-to-end services to be provisioned across multiple, separately administered network clouds and on keeping the consequent business models as simple as possible.

Accordingly, the goal of the evolving IETF differentiated services (diffserv) framework is to provide a means of offering a spectrum of services in the Internet without the need for per-flow state and signaling in every router. By carefully aggregating a multitude of QoS-enabled flows into a small number of aggregates that are given a small number of differentiated treatments within the network, diffserv eliminates the need to recognize and store information about each individual flow in core routers. This effort to scalability succeeds by combining a small number of simple packet treatments with a larger number of per-flow policing policies to provide a broad and flexible range of services. Each diffserv flow is policed and marked at the first trusted downstream router according to a contracted service profile (usually a token bucket filter). When viewed from the perspective of a network administrator, the first trusted downstream router is a "leaf router" at the periphery of the trusted network. Downstream from the nearest leaf router, a diffserv flow is mingled with similar diffserv traffic into an aggregate. All subsequent forwarding and policing is performed on aggregates.

Current proposals for marking packets designate the "per-hop behaviors" (PHBs) that packets are to receive by setting a few bits in the IPv4 header TOS octet or the IPv6 Traffic Class octet—now renamed the "DS field". The PHBs are expected to be simple and define forwarding behaviors that may suggest, but do not require, a particular implementation or queuing discipline. Examples include: "drop me last" or "forward me first". Keeping the number of PHBs small and the behaviors themselves simple should allow router designers to engineer diffserv packet forwarders that operate at very high packet per second rates.

Another important benefit of handling traffic aggregates is to simplify the construction of end-to-end services from the concatenation of multiple cloud-to-cloud services. Individual network clouds contract with neighboring clouds to provide differentiated service contracts for different traffic aggregates. Like the per-flow contracts, aggregate contracts are characterized by profiles (again, often based on token bucket filters). By carefully enforcing the aggregate traffic profiles and ensuring that new traffic is not admitted that exceeds any aggregate profile, well-defined end-to-end services may be provided over chains of separately administered clouds. Furthermore, since each aggregate contracts exists only at the boundary between two clouds, the result is a set of simple bilateral service agreements that mimic current inter-provider exchange agreements.

As suggested above, multiple priority networks have been proposed to support differentiated services over the IP networks. In these models, customer traffic carries a codepoint in the Differentiated Services (DS) field in the IP header that identifies the Per-Hop Behavior (PHB) the traffic is entitled to at each hop en route to its destination. The codepoints index into an array that determines the PHB, and hence different levels of service. Currently, work is underway in IETF to standardize the codepoints and the associated PHBs, so that vendors can implement them in their equipment and ISPs can offer services using the standards-based implementations.

Generally speaking, a PHB corresponds to a queue that services a particular priority class, and inside each class, there are two sub-classes. One of the sub-classes identifies the traffic (in that particular class) that is behaving according to the agreed contract. This sub-class is called "in-profile" traffic. The other sub-class is the one that is exceeding the limit's of the agreed contract, and is thus called "out-profile" traffic. Separate queues for in-profile and out-profile traffic are anticipated for each class, and the different classes are serviced using a scheduling discipline such as Weighted Fair Queuing (WFQ) or Weighted Round Robin (WRR) or simple priority queuing. In each case, it is proposed that the in-profile traffic of each class be serviced ahead of the out-profile traffic, possibly in order to provide fairness to various classes of traffic.

However, there exists an important problem associated with the proposed architecture of the differentiated services. The packet reordering creates a problem due to the use of multiple priority queues for the traffic belonging to the same class. This problem arises because the traffic from a source can change from in-profile to out-profile (and then back to in-profile) dynamically, and, thus get serviced differently at a router or a switch. The result is that the packets may arrive out-of-order at a receiver, with serious implications on the application and network performance. In audio and video applications, this reordering could destroy temporal ordering between different packets, producing a "play-ahead" effect. For example, a word $W_{(n+1)}$ that is spoken after the word $W_{(n)}$ may get played back first at the receiver. For TCP, reordering produces duplicate acknowledgments resulting in wasteful retransmissions. Thus, it is clear that this important problem has to be addressed in order to maintain acceptable performance for applications and the network.

It can be seen then that there is a need for a queue implementation technique that can be used in multiple-class, multiple-priority networks such as Differentiated Services networks to ensure that packets are serviced without reordering.

It can also be seen that there is a need for a queue implementation technique that maintains performance isolation between different classes under some scheduling disciplines.

It can also be seen that there is a need for a queue implementation that can identify scheduling disciplines which do not degrade the performance seen by the lower priority traffic classes.

SUMMARY OF THE INVENTION

To overcome the limitations in the prior art described above, and to overcome other limitations that will become apparent upon reading and understanding the present specification, the present invention discloses a method and apparatus for avoiding packet reordering in multiple-class, multiple-priority networks.

The present invention solves the above-described problems by providing a queue implementation technique that can be used in multiple-class, multiple-priority networks such as Differentiated Services networks to ensure that packets are serviced without reordering. The queue implementation technique maintains performance isolation between different classes under some scheduling disciplines and can identify scheduling disciplines which do not degrade the performance seen by the lower priority traffic classes.

A system in accordance with the principles of the present invention includes a first queue for receiving packets associated with a first traffic class, the packets being arranged in the first queue as in-profile packets and out-profile packets and a second queue for storing pointers associated with the out-profile packets, wherein the packets in the first queue comprise doubly-linking, and the pointers associated with the out-profile packets in the second queue point to corresponding out-profile packets in the first queue as well as to a previous and next element in the second queue.

Other embodiments of a system in accordance with the principles of the invention may include alternative or optional additional aspects. One such aspect of the present invention is that the size of the second queue is inversely proportional to the performance of processing the in-profile packets.

Another aspect of the present invention is that the packets in the first queue are serviced using simple priority queuing.

Another aspect of the present invention is that packets arriving at the first queue are serviced first.

Another aspect of the present invention is that corresponding pointers in the second queue are deleted and the pointers in the second queue are adjusted in response to an out-profile packet being serviced.

Another aspect of the present invention is that a corresponding packet in the first queue is deleted and the double-linking of the packets in the first queue is adjusted in response to an out-profile packet being dropped from the second queue ahead of its service from the second queue.

Another aspect of the present invention is that the first queue is a service queue and the second queue is a mirror queue.

Another aspect of the present invention is that the first queue and the second queue comprise a single memory device.

Another aspect of the present invention is that the first queue and the second queue comprise individual memory devices.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a queue implementation technique that can be used in multiple-class, multiple-priority networks such as Differentiated Services networks to ensure that packets are serviced without reordering. The queue implementation technique maintains performance isolation between different classes under some scheduling disciplines and can identify scheduling disciplines which do not degrade the performance seen by the lower priority traffic classes.

Figure 1:
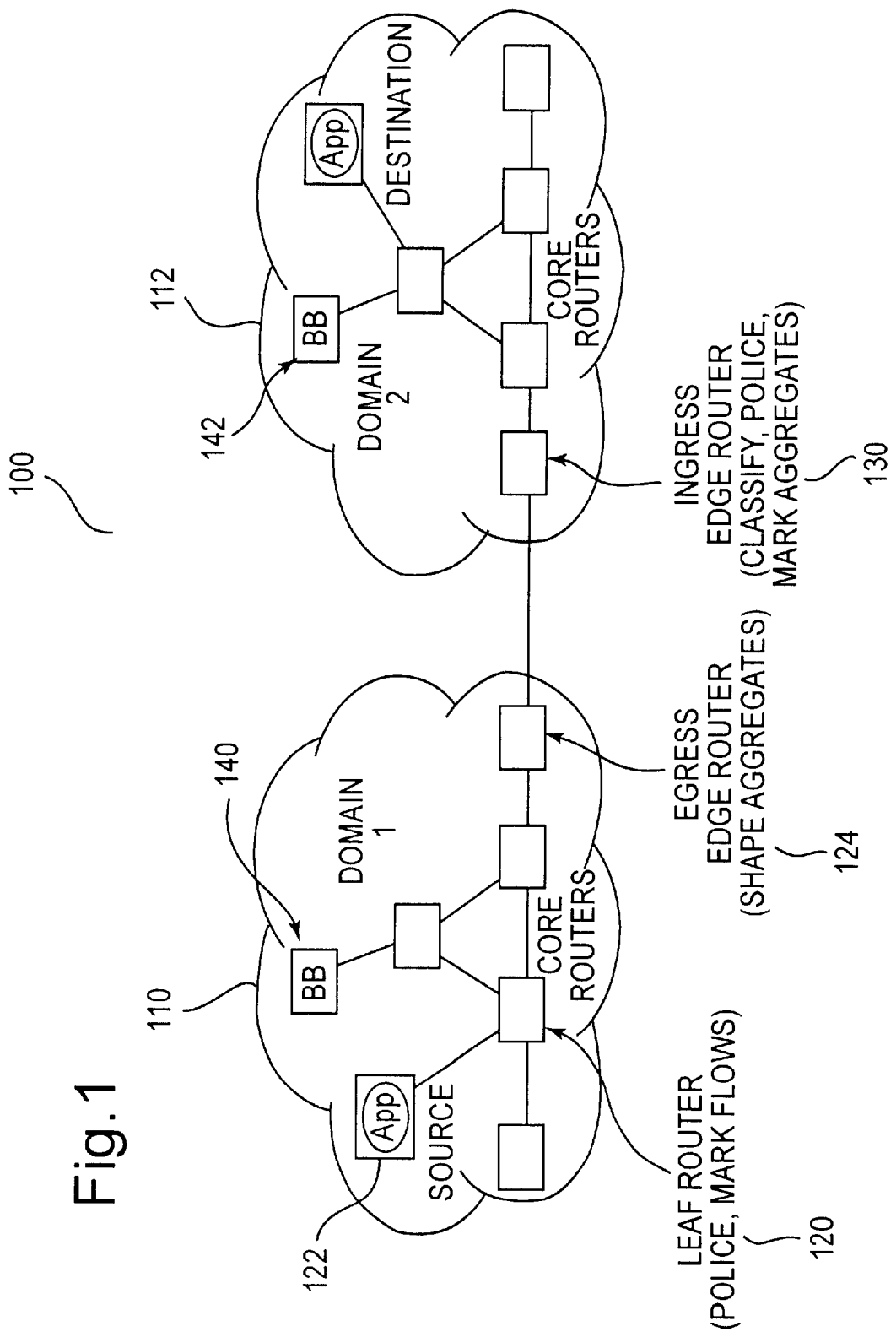
FIG. 1 illustrates a network that illustrates the use of differentiated services between two Internet clouds.

FIG. 1 illustrates a network 100 that illustrates the use of differentiated services between two Internet clouds 110, 112. The network components also provide functionality for diffserv-enabled packet forwarding, classifying, policing, marking and bandwidth brokering.

Per-flow policing and marking is performed by the first trusted leaf router 120 downstream from the sending host 122. When a local admissions control decision has been made by the sender's cloud 110, the leaf router 120 is configured with the contracted per-flow service profile. Downstream from the first leaf router 120, an egress router 124 handles all traffic as aggregates.

On cloud ingress, incoming traffic is classified by an ingress edge router 130 using the PHB bits into aggregates, which are policed according to the aggregate profiles in place. Depending on the particular diffserv service model in question, out-of-profile packets are either dropped at the edge by the ingress edge router 130 or are remarked with a different PHB. As in-profile traffic traverses a cloud, it may experience induced burstiness caused by queuing effects or increased aggregation. Consequently, clouds may need to shape at the egress edge router 124 to prevent otherwise conforming traffic from being unfairly policed at the next downstream cloud 112.

Finally, to make appropriate internal and external admissions control decisions and to configure leaf 120 and edge device 130 policers correctly, each cloud 110, 112 is outfitted with a bandwidth broker 140, 142 (BB). When a sender 122 signals its local bandwidth broker 140 to initiate a connection, the user is authenticated and subject to a local policy-based admissions control decision. On behalf of the sender 122, the bandwidth broker 140 then initiates an end-to-end call setup along the chain of bandwidth brokers representing the clouds to be traversed by the flow. The abstraction of the bandwidth broker's 140, 142 is critically important because it allows separately administered network clouds (possibly implemented with very different underlying technologies and polices) to manage their network resources as they see fit.

Figure 2:
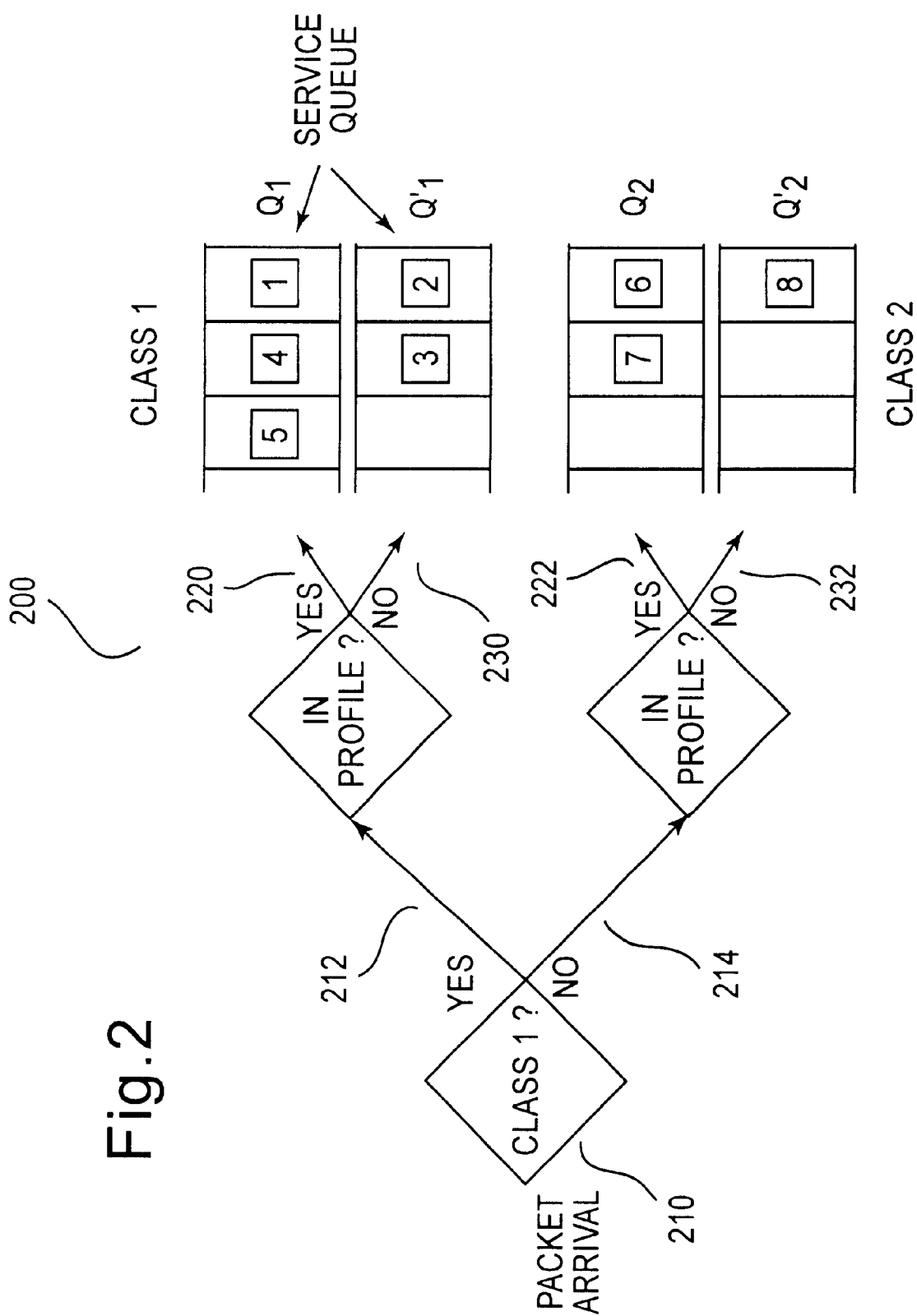
FIG. 2 illustrates a decision tree for queuing arriving packets.

FIG. 2 illustrates a decision tree for queuing arriving packets 200. In FIG. 2, a simple two class scheme 210 where the priority of class 1 212 is better than the priority of class 2 214. The in-profile traffic 220, 222 in each class is serviced first, before servicing the out-profile traffic 230, 232, and the in-profile traffic in class 2 222 is serviced prior to servicing the out-profile traffic in class 1 230. In any case, as long as there is priority ordering between the in-profile and out-profile queues in any class, it can be seen that potential for packet reordering exists.

For example, when the packets arrive in the order 1, 2, 3, 4, 5, 6, 7, and 8. They are classified based on the DS codepoint as belonging to either class 1 212 or class 2 214. Inside each class, they are further classified as in-profile 220, 222 or out-profile 230, 232 based on their contract. In FIG. 2, packets 2 and 3 are out-profile in class 1 230 and packet 8 is out-profile in class 2 232. Now, if the queues are serviced in the following order: $Q_1$, $Q_2$, $Q'_1$, $Q'_2$ Or, $Q_1$, $Q'_1$, $Q_2$, $Q'_2$, then the packets leave the system in the following order: 1, 4, 5, 6, 7, 2, 3, 8, or 1, 4, 5, 2, 3, 6, 7, 8, respectively. In both the cases, packets belonging to class 1 212 get reordered. For this example, there is no reordering for class 2 214. So, it is clear that packet reordering is a potential problem in such networks 100 as shown in FIG. 1, and thus needs to be addressed appropriately.

Figure 3:
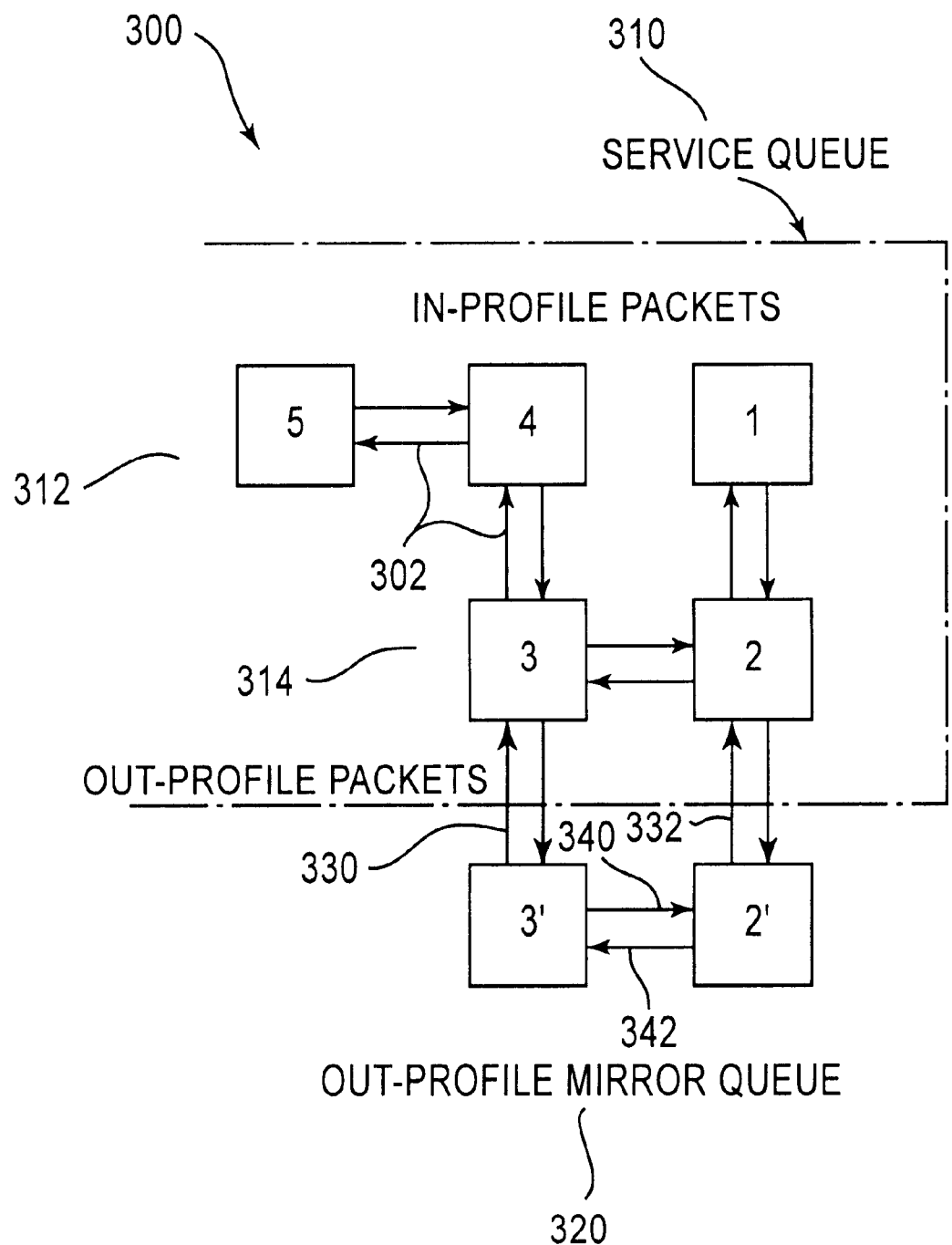
FIG. 3 illustrates a queue according to the present invention that prevents packet reordering.

FIG. 3 illustrates a queue according to the present invention 300 that prevents packet reordering. In FIG. 3, doubly-linked lists 302 are used for packets belonging to a single class (in this case, class 1 212 as illustrated in FIG. 2). Similar structures are used for any other classes of traffic. A single service queue 310 is used for servicing both in-profile 312 and out-profile 314 traffic. However, there is an additional queue 320 that is a partial mirror image of the out-profile packets 314. The elements of this partially mirrored queue simply contain pointers to their corresponding out-profile packets 330, 332 in the service queue 310, and pointers to the previous 342 and next 340 elements in the partially mirrored queue 320 itself. This avoids the unnecessary overhead of maintaining the packet information in the mirrored queue 320. The packets in the mirrored queue 320 are subject to dropping based on some queue management technique such as Random Early Detection (RED). By keeping the length of the mirror queue 320 small, performance of the in-profile traffic 312 can be maintained within acceptable limits. In other words, the length of the mirror queue 320 may be traded for the performance in processing the in-profile packets 312.

If we assume a WFQ or WRR service discipline, then, there is no impact on the performance of other classes. This is easy to see because the wait times of lower priority classes depends only on the weights of higher priority classes. The fact that a higher priority class may service both in-profile and out-profile traffic during its "round" does not increase the wait times for the lower priority classes, as long as the weight assigned for a class remains constant. It should be clear however that the amount of out-profile traffic in each class affects the in-profile traffic in the same class. Using an active queue management policy, one could set different levels of thresholds for the out-profile traffic in different classes.

On the other hand, if the service discipline is simple priority queuing, where a higher priority class is always serviced ahead of the lower priority classes, then this implementation can degrade their performance if the amount of out-profile traffic is not controlled appropriately. However, through careful engineering, it should be possible to utilize this scheme even in a priority queuing system.

Figure 4:
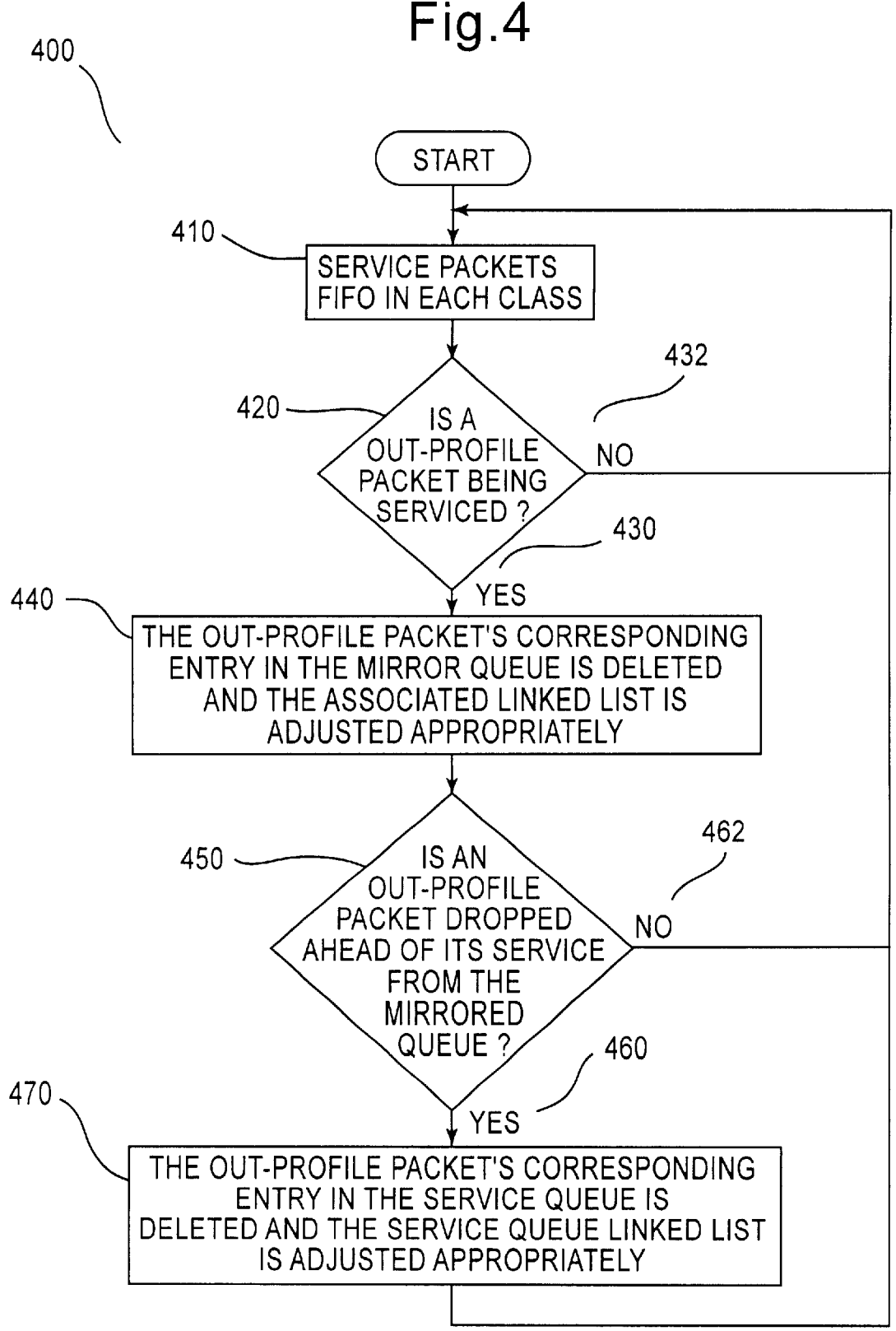
FIG. 4 illustrates a flow chart for processing packets using priority queuing.

FIG. 4 illustrates a flow chart 400 for processing packets using priority queuing. First packets are serviced in FIFO manner in each class 410. A determination 420 is made as to whether an out-profile packet is serviced 430, or is not serviced 432. When an out-profile packet is serviced 430, its corresponding entry in the mirror queue is deleted and the associated linked list is adjusted appropriately 440. A determination 450 is made as to whether an out-profile packet is dropped ahead of its service 460, or is not dropped ahead of its service 462. When an out-profile packet is dropped ahead of its service by a queue management technique from the mirror queue 460, the corresponding entry in the service queue is deleted and the service queue linked list is adjusted appropriately 470. Thus, the queuing method according to the present invention allows simple priority queuing for servicing higher priority classes ahead of lower priority classes, while preventing a degradation in performance.

Figure 5:
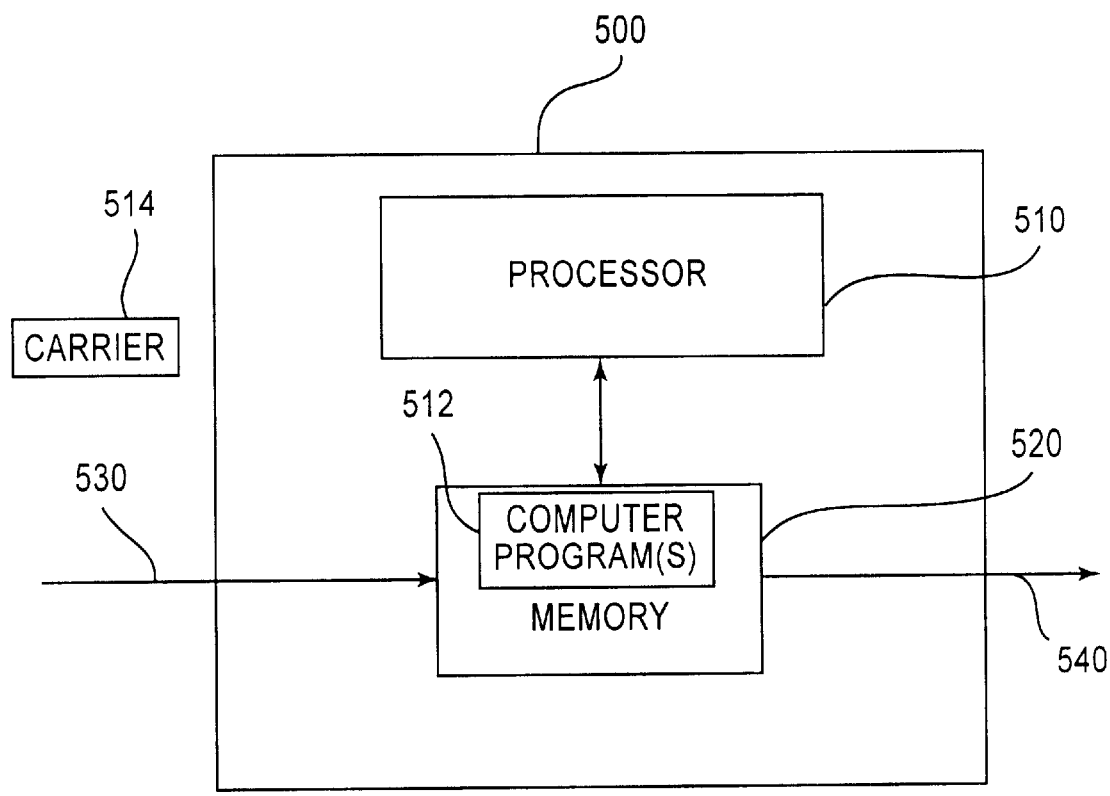
FIG. 5 illustrates a block diagram of a hardware implementation of the present invention.

FIG. 5 illustrates a block diagram of a hardware implementation 500 of the present invention. A switch according to the present invention includes a processor 510 and memory or buffer 520 which may include random access memory (RAM), or any other memory configuration. The processor 510 operates under the control of an operating system (not shown) and is configured to execute one or more computer programs, which are represented in FIG. 5 by the "box" 512 within the block indicating the memory 520. Generally, the computer programs 512 may be tangibly embodied in a computer-readable medium or carrier 514. The computer programs 512 may be loaded from the computer-readable medium or carrier 514 into memory 520 for execution by the process or 510 as discussed above with reference to FIGS. 3–4. The computer program 512 comprises instructions which, when read and executed by the processor 510, causes the processor 510 to perform the steps necessary to execute the steps or elements of the present invention. Packets are received at an ingress 530, stored in memory 520, and the transmitted at egress 540 under control of the processor 510, which provides queuing from the memory 520 as discussed above with reference to FIGS. 3–4. Those skilled in the art will therefore recognize that memory 520 may be separate memory devices for storing the program 512 and for queuing packets, or may be a signal memory device. Further, although an exemplary system configuration is illustrated in FIG. 5, those skilled in the art will recognize that any number of different configurations performing similar functions may be used in accordance with the present invention.

In summary, the present invention provides a simple queue implementation scheme for avoiding packet reordering in multiple class, multiple priority networks. Such networks are being proposed for supporting Differentiated Services over the IP networks, and hence are immensely important to consider from a network design perspective. It is anticipated that the queue according to the present invention is readily applicable for such networks.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for avoiding packet reordering in multiple-class, multiple-priority networks comprising:
    receiving packets in a first queue, the first queue being associated with a first traffic class, the packets in the first queue comprising doubly-linking;
    arranging the received packets in the first queue as in-profile packets and out-profile packets; and
    storing pointers associated with the out-profile packets in a second queue, the pointers in the second queue being associated with corresponding out-profile packets in the first queue and to a previous and next element in the second queue.

2. The method of claim 1 wherein the size of the second queue is inversely proportional to the performance of processing the in-profile packets.

3. The method of claim 1 further comprising servicing the packets in the first queue using simple priority queuing.

4. The method of claim 3 further comprising servicing packets arriving at the first queue first.

5. The method of claim 4 further comprising deleting corresponding pointers in the second queue and adjusting the pointers in the second queue in response to an out-profile packet being serviced.

6. The method of claim 5 further comprising deleting a corresponding packet in the first queue and adjusting the double-linking of the packets in the first queue in response to an out-profile packet being dropped from the second queue ahead of its service from the second queue.

7. The method of claim 1 wherein the first queue is a service queue and the second queue is a mirror queue.

8. The method of claim 1 wherein the first queue and the second queue comprise a single memory device.

9. The method of claim 1 wherein the first queue and the second queue comprise individual memory devices.

10. A queue system, comprising:
    a first queue for receiving packets associated with a first traffic class, the packets being arranged in the first queue as in-profile packets and out-profile packets; and
    a second queue for storing pointers associated with the out-profile packets;
    wherein the packets in the first queue comprise doubly-linking, and the pointers associated with the out profile packets in the second queue point to corresponding out-profile packets in the first queue as well as to a previous and next element in the second queue.

11. The queue system of claim 10 wherein the size or the second queue is inversely proportional to the performance of processing the in-profile packets.

12. The queue system of claim 10 wherein the packets in the first queue are serviced using simple priority queuing.

13. The queue system of claim 12, wherein packets arriving at the first queue are serviced first.

14. The queue system of claim 13 wherein corresponding pointers in the second queue are deleted and the pointers in the second queue are adjusted in response to an out-profile packet being serviced.

15. The queue system of claim 14 wherein a corresponding packet in the first queue is deleted and the double-linking of the packets in the first queue is adjusted in response to an out-profile packet being dropped from the second queue ahead of its service from the second queue.

16. The queue system of claim 10 wherein the first queue is a service queue and the second queue is a mirror queue.

17. The queue system of claim 10 wherein the first queue and the second queue comprise a single memory device.

18. The queue system of claim 10 wherein the first queue and the second queue comprise individual memory devices.

19. A switch, comprising:
at least one memory device for providing queues for packet traffic; and
a processor, coupled to the at least one memory device, for servicing packets queued in the at least one memory;
wherein the at least one memory device further comprises:
a first queue for receiving packets associated with a first traffic class, the packets being arranged in the first queue as in-profile packets and out-profile packets; and
a second queue for storing pointers associated with the out-profile packets;
wherein the packets in the first queue comprise doubly-linking, and the pointers associated with the out-profile packets in the second queue point to corresponding out-profile packets in the first queue as well as to a previous and next element in the second queue.

20. The switch of claim 19 wherein the size or the second queue is inversely proportional to the performance of processing the in-profile packets.

21. The switch of claim 19 wherein the packets in the first queue are serviced using simple priority queuing.

22. The switch of claim 21, wherein packets arriving at the first queue are serviced first.

23. The switch of claim 22 wherein corresponding pointers in the second queue are deleted and the pointers in the second queue are adjusted in response to an out-profile packet being serviced.

24. The switch of claim 23 wherein a corresponding packet in the first queue is deleted and the double-linking of the packets in the first queue is adjusted in response to an out-profile packet being dropped from the second queue ahead of its service from the second queue.

25. The switch of claim 19 wherein the first queue is a service queue and the second queue is a mirror queue.

26. The switch of claim 19 wherein the first queue and the second queue comprise a single memory device.

27. The switch of claim 19 wherein the first queue and the second queue comprise individual memory devices.

28. An article of manufacture for packet queuing without packet reordering, the article of manufacture comprising a computer readable medium having instructions for causing a processor to perform a method comprising:
receiving packets in a first queue, the first queue being associated with a first traffic class, the packets in the first queue comprising doubly-linking;
arranging the received packets in the first queue as in-profile packets and out-profile packets; and
storing pointers associated with the out-profile packets in a second queue, the pointers in the second queue being associated with corresponding out-profile packets in the first queue and to a previous and next element in the second queue.

29. The article of manufacture of claim 28 wherein the size or the second queue is inversely proportional to the performance of processing the in-profile packets.

30. The article of manufacture of claim 28 further comprising servicing the packets in the first queue using simple priority queuing.

31. The article of manufacture of claim 30 further comprising servicing packets arriving at the first queue first.

32. The article of manufacture of claim 31 further comprising deleting corresponding pointers in the second queue and adjusting the pointers in the second queue in response to an out-profile packet being serviced.

33. The article of manufacture of claim 32 further comprising deleting a corresponding packet in the first queue and adjusting the double-linking of the packets in the first queue in response to an out-profile packet being dropped from the second queue ahead of its service from the second queue.

34. The article of manufacture of claim 28 wherein the first queue is a service queue and the second queue is a mirror queue.

35. The article of manufacture of claim 28 wherein the first queue and the second queue comprise a single memory device.

36. The article of manufacture of claim 28 wherein the first queue and the second queue comprise individual memory devices.

* * * * *